(12) United States Patent
Calado Da Silva et al.

(10) Patent No.: US 10,202,307 B2
(45) Date of Patent: Feb. 12, 2019

(54) SINTERED CERAMIC MATERIAL, POWDER COMPOSITION FOR OBTAINING THEREOF, MANUFACTURING PROCESS AND CERAMIC PIECES THEREOF

(71) Applicant: INNOVNANO—MATERIAIS AVANÇADOS, SA., Coimbra (PT)

(72) Inventors: Joao Manuel Calado Da Silva, Coimbra (PT); Nuno Miguel Pinto Neves, Coimbra (PT); Helena Sofia Marques Pinto Soares, Coimbra (PT); Marisa Fernanda Batouxas Rodrigues, Coimbra (PT); Rosa Filomena Duarte Vitoria Calinas, Coimbra (PT)

(73) Assignee: INNOVNANO—MATERIAIS AVANCADOS, SA, Coimbra (PT)

( * ) Notice: Subject to any disclaimer, the term of this patent is extended or adjusted under 35 U.S.C. 154(b) by 0 days.

(21) Appl. No.: 15/121,662

(22) PCT Filed: Mar. 24, 2015

(86) PCT No.: PCT/IB2015/052154
§ 371 (c)(1),
(2) Date: Aug. 25, 2016

(87) PCT Pub. No.: WO2015/145354
PCT Pub. Date: Oct. 1, 2015

(65) Prior Publication Data
US 2016/0368826 A1 Dec. 22, 2016

(30) Foreign Application Priority Data

Mar. 27, 2014 (PT) .......................... 107543

(51) Int. Cl.
C04B 35/488 (2006.01)
C04B 35/64 (2006.01)
C01G 25/02 (2006.01)
C04B 35/486 (2006.01)
C04B 35/645 (2006.01)

(52) U.S. Cl.
CPC .......... *C04B 35/4885* (2013.01); *C01G 25/02* (2013.01); *C04B 35/486* (2013.01); *C04B 35/64* (2013.01); *C04B 35/6455* (2013.01); *C01P 2002/54* (2013.01); *C01P 2002/60* (2013.01); *C01P 2004/03* (2013.01); *C01P 2004/62* (2013.01); *C01P 2006/10* (2013.01); *C01P 2006/12* (2013.01); *C01P 2006/80* (2013.01); *C04B 2235/3217* (2013.01); *C04B 2235/3225* (2013.01); *C04B 2235/3246* (2013.01); *C04B 2235/3248* (2013.01); *C04B 2235/5409* (2013.01); *C04B 2235/5445* (2013.01); *C04B 2235/5454* (2013.01); *C04B 2235/5463* (2013.01); *C04B 2235/602* (2013.01); *C04B 2235/604* (2013.01); *C04B 2235/6562* (2013.01); *C04B 2235/6565* (2013.01); *C04B 2235/6567* (2013.01); *C04B 2235/66* (2013.01); *C04B 2235/72* (2013.01); *C04B 2235/765* (2013.01); *C04B 2235/77* (2013.01); *C04B 2235/785* (2013.01)

(58) Field of Classification Search
CPC .......................... C04B 35/488; C04B 35/4885
See application file for complete search history.

(56) References Cited

U.S. PATENT DOCUMENTS

| | | | | | |
|---|---|---|---|---|---|
| 4,360,598 | A | * | 11/1982 | Otagiri | C04B 35/486 264/658 |
| 4,587,225 | A | * | 5/1986 | Tsukuma | C04B 35/488 501/103 |
| 6,905,993 | B2 | * | 6/2005 | Sakuta | B82Y 30/00 501/105 |
| 7,291,574 | B2 | * | 11/2007 | Tanaka | C01G 25/02 501/103 |
| 2011/0254181 | A1 | | 10/2011 | Holand et al. | |
| 2013/0190164 | A1 | | 7/2013 | Ito et al. | |
| 2014/0011661 | A1 | | 1/2014 | Krstic | |

FOREIGN PATENT DOCUMENTS

| EP | 0908425 A1 | 4/1999 |
|---|---|---|
| EP | 2045222 A1 | 4/2009 |

(Continued)

OTHER PUBLICATIONS

M. Watanabe, et al; Aging behavior of Y-TZP; Advances in Ceramics, American Ceramic Society Inc.; vol. 12; Jan. 1984; pp. 391-398.

(Continued)

*Primary Examiner* — Karl E Group
(74) *Attorney, Agent, or Firm* — Lucas & Mercanti, LLP

(57) ABSTRACT

The present application discloses a sintered ceramic material having high fracture toughness and bending strength, which is obtained from an yttria-stabilized Zirconia powder, the powder composition for obtaining said material, sintered ceramic pieces and manufacturing process thereof. One of the solutions of the present invention discloses a sintered ceramic material which is obtained from an yttria-stabilized zirconia powder, comprising between 1.8 and 2.1 mol % yttria, wherein the sintered ceramic material has a percentage of tetragonal phase greater than 90% at room temperature, a grain size between 0.1 to 0.25 μm, the bending strength is between 1150-2100 MPa, and simultaneously a toughness greater than 10 MPa·m$^{1/2}$. This material may be applied in different sintered ceramic pieces, including pieces for the automotive sector, for diverse machinery, ornamental applications such as timepieces or pieces for biomedical applications, among others.

13 Claims, 4 Drawing Sheets

(56) References Cited

FOREIGN PATENT DOCUMENTS

| EP | 1437333 | A1 | | 4/2013 |
|---|---|---|---|---|
| JP | 2001302345 | | * | 10/2001 |
| JP | 2001316178 | | * | 11/2001 |
| JP | 2002154873 | | * | 5/2002 |

OTHER PUBLICATIONS

M. Yoshinaka, et al; Characterisation and sintering of yttria doped zirconia powders prepared by . . . ; British Ceramic Transactions, Institute of Materials; vol. 93; No. 6; Jan. 1994; pp. 35-38.
K. Matsui, et al; Grain-boundary structure and microstructure development mechanism in . . . ; ScienceDirect; Acta Materialia; vol. 56; No. 6; Jan. 2008; pp. 1315-1325.
International Search Report dated Aug. 18, 2015 for PCT/IB2015/052154.
Written Opinion dated Aug. 18, 2015 for PCT/IB2015/052154.

* cited by examiner

SINTERED CERAMIC MATERIAL, POWDER COMPOSITION FOR OBTAINING THEREOF, MANUFACTURING PROCESS AND CERAMIC PIECES THEREOF

CROSS REFERENCE TO RELATED APPLICATION

This Application is a 371 of PCT/IB2015/052154 filed on Mar. 24, 2015, which claims priority of Portuguese Application No. 107543 filed Mar. 27, 2014, both of which are incorporated herein by reference.

TECHNICAL FIELD

The present application discloses a sintered ceramic material having high fracture toughness and bending strength, which is obtained from an yttria-stabilized Zirconia powder, the powder composition for obtaining said material, sintered ceramic pieces, manufacturing process and possible uses thereof.

This material may be applied in different sintered ceramic pieces, including pieces for the automotive sector, for diverse machinery, or pieces for biomedical applications, among others.

STATE OF THE ART

Ceramic materials, in particular those intended for structural applications, have a high limitation with respect to fracture toughness. In order to overcome this limitation, worldwide research has focused on finding a way to obtain a sintered ceramic material with high fracture toughness, without compromising the flexural strength thereof.

To achieve this aim, attention has been drawn for the past thirty years on the study of zirconium oxide ($ZrO_2$) characteristics, commonly known as zirconia, since among known ceramics it is a material which, when stabilized in its tetragonal phase, exhibits an excellent relationship between bending strength, which may have values around 1000-1300 MPa, and fracture toughness, which may have values around 6-10 MPa·$m^{1/2}$. Obtaining this combination of values, which has earn it the name "ceramic steel", is associated with the discovery of a phase transformation mechanism "transformation toughening" which is characteristic of this material and consists in changing from tetragonal to monoclinic phase, accompanied by a volume increase of about 5%, which allows it to absorb the tension induced during fracture progression, thus considerably increasing its toughness.

For an understanding of this energy absorption mechanism, which is the key to high toughness in zirconia, one must look into the corresponding phase diagram, which for a pure undoped zirconia is as follows: Monoclinic Phase from 0° C. to about 950-1170° C., Tetragonal Phase from 1170° C. to 2370° C. and Cubic Phase therefrom and changing to the liquid state above 2680° C. In order to achieve Zirconia stabilization in the tetragonal phase at room temperature and take advantage of the aforementioned processing mechanism, it is necessary to dope it previously together with a set of oxides wherein the respective metals have valence states different from those of Zirconium (+4), known as (phase) stabilizers, the most common being Magnesium, Calcium, Cerium and Yttrium oxides.

In terms of commercial products for highly demanding structural applications, zirconia stabilized with 3 mole yttria ($Y_2O_3$) have been developed and are well established in the market, which have improved bending strength values to around 1200 to 1300 MPa and can reach about 1800 MPa, in case the ceramic materials are shaped/sintered by hot isostatic pressing (HIP) even at relatively low values (compared to metal alloys) with respect to fracture toughness of about 5 MPa·$m^{1/2}$. Choosing yttrium is mainly due to the fact that yttrium and zirconium atoms have very similar atomic numbers and consequently have very similar atomic radii, easily forming a solid solution wherein yttrium atoms replace part of zirconium atoms in the crystal lattice due to the different valence state of the two cations, Zr(+4) and Y(+3). Yttrium oxide/yttria ($Y_2O_3$) allows the introduction of oxygen gaps within the lattice, leading to stability of the tetragonal phase at room temperature. It is precisely this transformable tetragonal phase at room temperature that allows obtaining an increase in toughness while maintaining high values of bending strength.

It is thus intended to obtain zirconia-based ceramic materials with high toughness and bending strength.

EP2045222 discloses sintered zirconia containing $Y_2O_3$ as a stabilizer in the solution and having light transmitting properties, meaning it is translucent. According to the description of this document, the material claimed therein has a three point bending strength of 1700 MPa and a fracture toughness of between 3.5 and 4.0 MPa·$m^{1/2}$. Thus, unlike the technology disclosed in the present application, a good relationship between fracture toughness and bending strength values is not achieved.

US2013190164 (A1) discloses a ceramic material prepared from a mixture of zirconia stabilized with 3 mole yttria, alumina (0.2 to 7.4 wt %), and different mixtures (corresponding to 20% of the final weight) composed of partially stabilized zirconia (1 mole yttria), boron and phosphorus. The material claimed therein has a bending strength of 1200-1400 MPa and fracture toughness with inversely proportional values between 8-11 MPa·$m^{1/2}$ for conventionally sintered bodies.

US2014011661 (A1) describes sintered objects wherein the stabilizer, besides yttria, is mostly Ceria with additional doping of Chromium oxide, the ceramic piece having 1150 MPa of bending strength values and 15 MPa·$m^{1/2}$ of fracture toughness of.

US2011254181 (A1) discloses zirconia-based materials wherein Ceria (8 to 10 mol %) is used as main stabilizer and second phases comprising multiple aluminates (12 to 20 wt %), with fracture toughness of 20 MPa·$m^{1/2}$ and bending strength of 630 MPa.

Another attempted approach consists in reducing yttria content to less than three mole. This approach deals with the fact that by reducing the amount of yttria, the number of oxygen gaps is reduced within the crystal lattice, thus increasing transformability of the tetragonal zirconia (since it decreases the Gibbs energy required for conversion from tetragonal into monoclinic phase), which is the basis of the phase transformation mechanism responsible for high toughness of the ceramic piece. The drawback of this embodiment resides in the difficulty of maintaining the tetragonal phase in the ceramic piece after a high temperature sintering step (1200-1600° C.) and subsequent cooling at room temperature. As a result of the decreased amount of yttria, during the piece cooling step, the transformation of a piece from tetragonal phase into monoclinic phase is thermally induced, which results in an inevitable reduction in the bending strength despite the high toughness values of 10-20 MPa·$m^{1/2}$ achieved through this approach.

"Toughening of yttria-stabilised tetragonal zirconia ceramics", by B. Basu, provides an extensive review of this variant. However, despite the manipulation of fracture toughness values within a wide range, the author does not achieve in any case a relationship between toughness and bending strength.

GENERAL DESCRIPTION

One of the problems that can be solved with the powder composition herein described is obtaining a Zirconia-based sintered ceramic material which presents in a high density sintered ceramic piece, a binomial value in terms of fracture toughness and bending strength i.e. with a high bending strength of 1150-2100 MPa, preferably 1200-2100 MPa and simultaneously a toughness greater than 10 MPa·m$^{1/2}$.

Calculation of fracture toughness may be performed based on the indentation method using the size of the cracks caused during indentation for hardness calculation. The results obtained and presented in this document considered a Palmqvist type of fracture. For this type of fracture, Niihara equation was used to calculate the fracture toughness upon indentation for 10 seconds with a force applied of 98.07N (HV10). Niihara, K., Morena, R. and Hasselman, D. P. H., "A fracture mechanics analysis of indentation induced"—Palmqvist crack in ceramics. J. Mater. Sci. Lett., 1983, 2(5) 221-3.

Bending strength of the present material was measured by biaxial flexural technique (from the English expression "biaxial bending strength") as described in ISO 6872:2008 (E): "Dentistry—Ceramic materials". based on yttria-stabilized tetragonal zirconia (Y-TZP) at 20° C.

An embodiment of the present invention discloses a sintered ceramic material obtained from yttria-stabilized zirconia—a sintered ceramic material which is obtained from a powder of yttria-stabilized zirconia—comprising between 1.8 and 2.1 mol % yttria/mol material—throughout this document references to mol % will always refer to the total mol % of material—wherein the sintered ceramic material has a tetragonal phase percentage greater than 90% and a grain size lower than 0.25 μm and greater than 0.1 μm since this value depends on the sintering techniques used. With these features, a material having a toughness of 10-25 MPa·m$^{1/2}$, preferably 12-25 MPa·m$^{1/2}$ and a bending strength of 1150-2100 MPa may surprisingly be obtained.

An embodiment of the present invention discloses a sintered ceramic material obtained from yttria-stabilized zirconia, comprising: between 1.8 and 2.1 mol % yttria, a toughness between 10-25 MPa·m$^{1/2}$, preferably 12-25 MPa·m$^{1/2}$ and a bending strength between 1150-2100 MPa.

Better results are obtained for a sintered ceramic material obtained from yttria-stabilized zirconia comprising 1.8 to 1.99% mol$_{yttria}$, preferably all values between 1.85-1.95% mol$_{yttria}$ even more preferably 1.86%; 1.87%; 1.88%; 1.89%; 1.9%; 1.91%; 1.92%; 1.93%, 1.94% mol$_{yttria}$.

Even better results are obtained for a sintered ceramic material when it is further doped with alumina—i.e. a sintered ceramic material which is obtained from a Zirconia powder further doped with alumina—between 0.2 and 1.5% w/w ceramic material, preferably 0.4-1% w/w ceramic material. The addition of alumina allows the grain to remain within the defined limits (0.1 to 0.2 μm) and simultaneously increases the strength of the sintered ceramic material against aging, i.e. wherein the monoclinic phase value after aging is less than 18%, preferably less than 10%.

The accelerated aging effect in the tetragonal phase into monoclinic phase transformation may be assessed by several methods, in this case having been determined by the method described by ISO 13356:2008(E)—Implants for surgery—Ceramic materials based on yttria-stabilized tetragonal zirconia (Y-TZP).

Another embodiment of the present invention discloses a sintered ceramic material obtained from yttria-stabilized zirconia comprising a grain size between 0.10-0.20 μm, preferably 0.10-0.15 μm.

The grain size of the sintered material may be calculated by several methods, in the characterization of the material the sintered grain size was determined by the linear intercept method according to EN 623-3(2001) Advanced technical ceramics—Monolithic ceramics—General and textural properties—Part 3: Determination of grain size and size distribution (characterized by the Linear Intercept Method). Additionally, ImageJ software was used, as indicated and commonly used for ceramic microstructure grain size measurement.

Even better results are obtained for the sintered ceramic material herein disclosed, having a material density greater than 5.97 g/cm$^3$. The final density of the sintered body may be calculated by various methods, for example by the Archimedes method according to ISO 18754:2013—Fine ceramics (advanced ceramics, advanced technical ceramics) determination of density and apparent density. The porosity is determined by the reverse of the density in percentage.

Even better results are obtained for the sintered ceramic material herein disclosed having a porosity of less than 2%, preferably less than 1%.

Even better results are obtained for the sintered ceramic material herein disclosed having a tetragonal phase percentage greater than 91%, preferably greater than 92%, 93%, 94%, 95%, 96%, 97%, 98%, 99%.

Another aspect of the present invention discloses a powder composition to obtain a sintered ceramic material comprising:
- yttria-stabilized zirconia having a molar percentage of yttria in the range of 1.8-2.1% mol$_{yttria}$/mol$_{final\ composition}$;
- 80% of the size of the powder particles ranges between 0.2 to 0.4 μm, preferably wherein 90% of the particles ranges between 0.2 μm and 0.4 μm;
- a crystallite particle size of less than 40 nm, preferably greater than 5 nm;
- a surface area of the powder particles of 17-35 m$^2$/g.

With this percentage of yttria doping, together with the other physical parameters of the starting powder already identified, a high binomial of the both already-described properties, fracture toughness and bending strength is achieved.

The starting powder particle size can be determined by several available methods, for example for the present characterization of the powder the centrifugal sedimentation method was selected based on CPS-Disc Centrifuge—Model DC20000™. This method allows for a particle size distribution free from agglomerates, which enhances the viability of the achieved value.

Identification and quantification of the crystalline phases/phase percentage/crystallite size can be determined by several methods available, for example the one used in the present powder characterization wherein the X-ray diffraction method was selected (using a Bruker D8 Advance X-ray diffractometer). In phase quantification and calculation of the crystallite size, the Rietveld refinement is applied based on DiffracPlus TOPAS software from Bruker AXS. The standard used is ASTM F1873-98 Standard Specification for High-Purity Dense yttria Tetragonal Zirconium oxide Polycrystal (Y-TZP) for Surgical Implant Applications (Withdrawn 2007). The crystallite size is determined by Scherrer equation that considers the width at half height (FWHM) of the main peak of the diffractogram obtained. Patterson, A.

L., The Scherrer formula for X-ray particle size determination. Phys. Rev., 1939, 56(10) 978-82. Rodriguez-Carvajar, J., Recent advances in magnetic structure determination by neutron power diffraction. Physica B: Condensed Matter., 1993, 192(1-2) 55-69.

Tetragonal phase may be calculated at room temperature, the latter being understood as ambient temperature which is common to one skilled in the art, wherein a person is accustomed to work comfortably and which can vary approximately between 15 to 30° C., preferably from 20 to 25° C., more preferably between 21 to 23° C., however without restricting it to temperatures above or below those limits, and provided that the temperature is acceptable and recognized as room temperature, i.e. inside the facilities.

Calculation of the specific surface area of the powder particles may be undertaken by several methods available, as for example that used in the present characterization of the powder wherein the Brunauer-Emmett-Teller method (BET) was selected. The equipment used is a Quantachrome Nova 1000e Series.

[1]Brunauer, S., Emmett, P. H. and Teller, E., Adsorption of gases in multimolecular layers. J. Am. Chem. Soc., 1938, 60(2), 309-19. [2]Webb, P. A., Analytical methods in fine particle technology. First edition, ISBN: 978-0965678308 Published 1997 by Micromeritics Instrument Corporation.

Even better results are obtained for a powder composition wherein the crystallite size ranges between 5-40 nm, preferably 10-30 nm, more preferably 15-25 nm and even more preferably between 20-22 nm.

Even better results are obtained for an yttria-stabilized zirconia powder composition when the chemical purity degree of the yttria-stabilized Zirconia is greater than 99.9%.

Even better results are obtained for an yttria-stabilized zirconia powder composition comprising 1.8 and 1.99% $mol_{yttria}/mol_{final\ composition}$, preferably all values between 1.85-1.95% $mol_{yttria}/mol_{final\ composition}$, preferably 1.86%, 1.87%, 1.88%, 1.89%, 1.90%, 1.91%, 1.92%, 1.93%, 1.94%, 1.95% $mol_{yttria}/mol_{final\ composition}$.

Even better results are obtained for an yttria-stabilized zirconia powder composition further doped with alumina between 0.2 and 1% $m_{alumina}/m_{final\ composition}$.

The powder compositions described herein may be obtained by several known methods such as combustion synthesis, co-precipitation, emulsion detonation synthesis, in particular by analogy (e.g. Ti/Zr) by the procedures described in examples disclosed in PT105340.

Another aspect of the present invention describes ceramic sintered piece(s) comprising the sintered ceramic material obtained from yttria-stabilized zirconia having the characteristics herein described. The sintered pieces may take many forms and be intended for various purposes such as an extrusion die, a piece that serves as corrosion protective coating, a cutting tool, a motor component, or pieces for biomedical applications such as a prosthesis, an implant, or ornamental applications such as timepieces, among others.

Another aspect of the present invention provides a process for obtaining the ceramic material comprising the following steps:
  shaping any powder composition herein described;
  sintering at temperatures between 1100 and 1400° C. for 1 to 8 h at heating/cooling rates between 0.5 and 500° C./min, preferably the sintering temperature may range between 1250 and 1350° C., the heating rate may range between 1 and 2° C./min and holding time between 1 and 2 h.

The process used to prepare the ceramic material from the starting powder composition may be any of those commonly used in industry, for example: Hot-Pressing (HP), Hot isostatic pressing (HIP), uniaxial pressing (UP), cold isostatic pressing (CIP), slip casting (SC) or injection molding (IM), or Spark Plasma Sintering (SPS).

In a preferred embodiment of the process for obtaining sintered material with spark plasma sintering technique, at heating rates of 500° C./min and very short holding times (between 10-15 min), it is possible to sinter compact elements using shorter sintering cycles, and thus obtain ceramic materials with small grain sizes and with excellent bending strength and fracture toughness.

DETAILED DESCRIPTION

The present application describes a sintered ceramic material with high fracture toughness and bending strength obtained from a powder of yttria-stabilized zirconia, with a composition and a number of other well defined physico-chemical parameters, manufacturing process of the sintered ceramic material and possible uses thereof.

The sintered ceramic material now presented comprises a fracture toughness ranging between 10 and 22 MPa·m$^{1/2}$ and a bending strength between 1150 and 2100 MPa. The present invention discloses a novel composition which—synergistically with a particular set of physical characteristics of an yttria-stabilized zirconia powder—surprisingly allows for a substantial increase in toughness and bending strength of a sintered ceramic material obtained from said zirconia powder. This ceramic material in the form of a sintered piece can be obtained from said zirconia powder according to one of several shaping/sintering methods currently used in the industry, while not allowing for thermal cooling after the sintering step to cause tetragonal phase into monoclinic transformation. This sintered ceramic material is based on yttria-stabilized zirconia, comprising between 1.8 and 2.1 mol % yttria.

In a further embodiment, and aiming at the sintered ceramic material presenting good characteristics, two other requirements may also be fulfilled:
1) A densification degree above 98%—corresponding to a maximum of 2% porosity. Taking into account that the theoretical density of tetragonal zirconia is 6.09 g/cm$^3$, it means that the density of the sintered ceramic material should be greater than 5.97 g/cm$^3$;
2) Having a well-defined final microstructure grain size, with good homogeneity in distribution, since the stability at room temperature of tetragonal structure is only achieved if after sintering the grain size is less than a determined critical size (0.25 μm). Otherwise conversion into the monoclinic phase occurs spontaneously. In the case of the present composition wherein the yttria content is between 1.8% and 2.1 mol % yttria, the ceramic material may preferably have a grain size between 0.10 μm and 0.25 μm even more preferably between 0.15 μm and 0.20 μm.

The sintered ceramic material herein disclosed may be used in structural applications such as cutting tools, extrusion dies, motor components, drawing components, corrosion protective coatings or biomedical applications such as prostheses or implants, or ornamental applications such as watchmaking, among others.

The process for obtaining the sintered ceramic material comprises the following steps:
  feeding into a shaping die the powder compositions of yttria-stabilized zirconia described in the present invention;

shaping and sintering process under appropriate conditions;
obtaining the final ceramic material.

In a preferred embodiment, in order to obtain this sintered ceramic material, the characteristics of the yttria-stabilized zirconia powder composition, play an important role, since a unique combination of some characteristics thereof surprisingly allow obtaining a sintered material having a bending strength between 1150-2100 MPa, and simultaneously a toughness greater than 10 MPa·m$^{1/2}$:

- a molar percentage of yttria between 1.8 and 2.1;
- preferably an alumina content from 0.2 to 1 mol %;
- a crystallite size of less than 40 nm, preferably between 5-40nm, even more preferably 10-30 nm;
- a surface area between 17-35 m$^2$/g;
- a particle size in which 80% of the size of the particles ranges between 0.2 μm and 0.4 μm, preferably wherein 90% of the particle size ranges between 0.2 μm and 0.4 μm.

In a preferred embodiment of the powder composition, the composition may also have the following preferred characteristics:

- a chemical purity degree in yttria-stabilized Zirconia greater than 99.9%, considering the sum of ($ZrO_2$+$HfO_2$+$Y_2O_3$+$Al_2O_3$);
- a high homogeneity in the distribution of yttria within the zirconia.

Thus the present invention, in combination with the powder composition characteristics, may surprisingly obtain a zirconia sintered ceramic piece, with a grain size less than 0.25 μm, having a tetragonal phase percentage greater than 90%, and a fracture toughness greater than 10 MPa m$^{1/2}$ and a bending strength of between 1150 and 2100 MPa.

The following is a brief explanation of the contribution of each of these seven parameters for the final result of the present invention.

Mol % Yttria

Toughness increases as the amount of yttria (starting from 3 mol %) is decreased. This increase is however not linear, reaching maximum values in the range of values herein listed 1.8 and 2.1%. Below 1.8% tetragonal phase is no longer stable and a significant conversion into monoclinic phase is observed during cooling process of the sintered ceramic material, which in turn substantially reduces its bending strength.

Reduced Crystallite Size

The influence of the crystallite size of zirconia powder has to do with the fact that the final grain size depends, among other characteristics, on the crystallite size of the starting powder. For crystallite sizes above 40 nm achieving dense pieces with a grain size between 0.15 and 0.25 μm, with a conventional shaping/sintering method is not possible.

High Surface Area

The surface area between 17-35 m$^2$/g is important in order to reduce the sintering temperature during the shaping/sintering method, thus being possible to prevent the final grain size (which increases with temperature) from exceeding 0.25 μm. The value 35 m$^2$/g is the maximum limit considering the processing difficulties motivated by high friction between the powder particles and the die, which are generated for powders with high surface areas.

Doping with Alumina

Doping with alumina between 0.2 and 1% comes from the inhibiting effect of alumina on the grain size of the final microstructure of sintered ceramic material, thus contributing for the later to remain within predetermined limits (0.15 to 0.25 μm) and while increasing the strength of the sintered ceramic material to aging, which consists in the transformation of the tetragonal phase into monoclinic phase in moist environments.

Particle Size between 0.2-0.4 Microns

The requirement for particle size distribution is related to sintering kinetics for obtaining dense ceramics pieces with a porosity of less than 2%, preferably less than 1%. An improved sintering kinetics reduces the temperature at which densities>98% are achieved, thus facilitating obtaining the final grain size of the sintered body within the predetermined range (less than 0.25 μm and greater than 0.1 μm).

Chemical Purity Degree (Zr+Hf+Y+Al+O)>99.9%

A high chemical purity degree is related to the fact that some specific contaminants such as Sodium, Iron and Silica are known to have a negative effect on the bending strength of a Zirconia ceramic piece. Thus, high purity degrees allow achieving the best results.

Yttria Homogeneity in Zirconia

The starting homogeneity of yttria within the zirconia powder is essential, so that the same distribution of yttria as a stabilizing element remains homogeneous within the sintered ceramic piece.

Any powder preparation method allowing the achievement of the above mentioned seven properties may be used for the embodiment of the present invention such as, among other possible methods, the combustion synthesis, co-precipitation and emulsion detonation synthesis.

The shaping process used to prepare the ceramic material from the starting powder may be any of those commonly used in industry, for example: Hot-Pressing (HP), Hot isostatic pressing (HIP), uniaxial pressing (UP), cold isostatic pressing (CIP), slip casting (SC) or injection molding (IM). The sintering conditions of each method such as the heating rate, temperature and holding time and cooling rate, should be adjusted depending on the shaping process used, so as to obtain ceramic pieces preferably with a densification degree greater than 98% (porosity less than 2%, preferably with a porosity less than 1%) and a grain size preferably between 0.1 and 0.25 μm.

DESCRIPTION OF THE DRAWINGS

For an easier understanding of the technique, drawings are herein attached, which represent preferred embodiments and which, however, are not intended to limit the scope of the present application.

DESCRIPTION OF THE EMBODIMENTS

Figure 1:
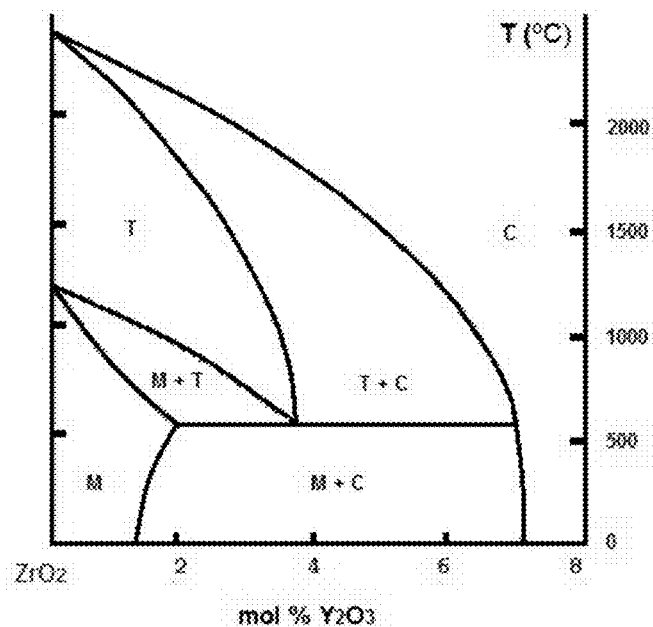
FIG. 1 shows the phase diagram $ZrO_2$-$Y_2O_3$.
Figure 2:
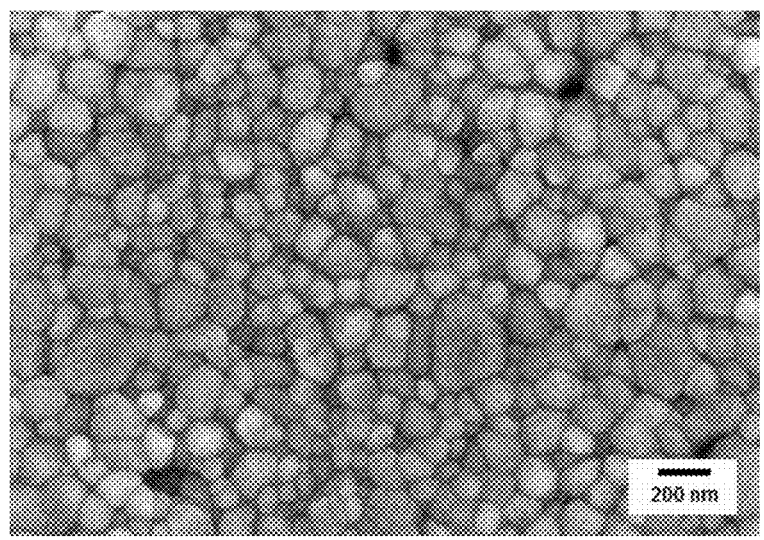
FIG. 2 shows an electron scanning microscope image of a sample of the ceramic material.
Figure 3:
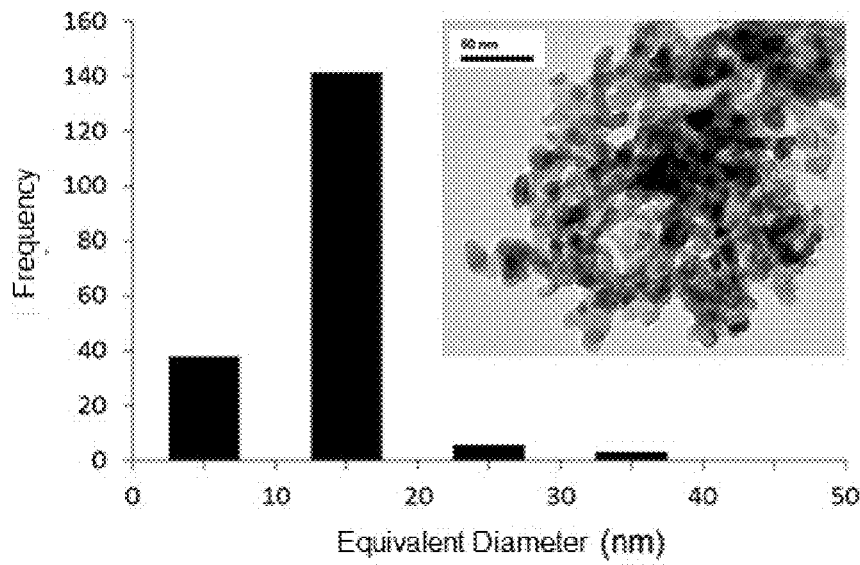
FIG. 3 shows a crystallite size distribution of the starting powder and micrograph thereof obtained by transmission electron microscopy.

The technology shall now be described in this subsection using some embodiments and figures, which are not intended to limit the scope of protection of the present application.

The present application describes a sintered ceramic material with high fracture toughness and bending strength, as well as the manufacturing process and possible uses thereof.

The sintered ceramic material now presented comprises a fracture toughness ranging between 10 and 25 MPa·m$^{1/2}$ and a bending strength (depending on the shaping/sintering method used) between 1150 and 2100 MPa. This sintered ceramic material is obtained from yttria-stabilized zirconia powder containing between 1.8 and 2.1 mol % yttrium.

With such yttria doping percentage, associated with a number of other starting powder properties, namely:
- a molar percentage of yttria between 1.8 and 2.1;
- preferably an alumina content from 0.2 to 1%;
- a crystallite size of less than 40 nm, preferably between 5-40nm;
- a surface area preferably between 17-35 m$^2$/g;
- an initial powder particle size between 0.2 and 0.4 μm;
- preferably a chemical purity degree of yttria-stabilized Zirconia greater than 99.9%, considering (Zr+Hf+Y+Al+O)>99.9%;
- preferably a high homogeneity in the distribution of yttria in the zirconia;

A high binomial of properties, fracture toughness and bending strength, in the sintered ceramic material is achieved.

The sintered ceramic material shall have a well-defined final microstructure grain size, with good homogeneity in distribution, since the stability at room temperature of tetragonal structure is only achieved if after sintering the grain size is less than a determined critical size, otherwise the conversion into monoclinic phase occurs spontaneously. In the case of the present composition wherein yttria content is between 1.8% and 2.1 mol % yttria, the ceramic material may have a grain size between 0.1 μm and 0.25 μm, preferably between 0.15 and 0.20 μm.

The sintered ceramic material herein disclosed may be used in structural applications, such as prosthesis, cutting tools, extrusion dies, motor components, among others.

In a preferred embodiment, the process for obtaining the ceramic material comprises the following steps:
- feeding into a shaping die the powder compositions of yttria-stabilized zirconia herein described;
- shaping and sintering process;
- obtaining the sintered ceramic material.

In order to obtain the sintered ceramic material, the yttria-stabilized zirconia powder characteristics play a key role, since only a combination of some of them in particular:
- a molar percentage of yttria between 1.8 and 2.1;
- an alumina content between 0.2 and 1%;
- a crystallite size of less than 40 nm, preferably greater than 5 nm;
- a specific surface area between 17-35 m$^2$/g;
- a particle size between 0.2 and 0.4 μm;
- preferably a chemical purity degree of yttria-stabilized zirconia greater than 99.9%, considering (Zr+Hf+Y+Al+O)>99.9%;
- preferably a high homogeneity in the distribution of yttria in the zirconia.

The present invention discloses that the combination of these seven characteristics of yttria-stabilized zirconia powder makes it possible to obtain a zirconia sintered ceramic piece with high density with a homogeneous grain size less than 0.25 μm, preferably greater than 0.10 μm, having a tetragonal phase greater than 90% at room temperature and having a toughness greater than 10 MPa·m$^{1/2}$ and a bending strength between 1150 and 2100 MPa, the latter depending on the shaping/sintering method used.

Application Examples

Table I shows several embodiments for which some characterization tests of the sintered ceramic material were performed, with regard to mechanical properties, specifically in terms of bending strength and fracture toughness.

Tests 1-7 (Effect of the Yttria Content)

For this series of tests samples of yttria-stabilized zirconia powder obtained by EDS (Emulsion Synthesis Detonation), with a chemical purity greater than 99.9% (expressed in terms of zirconia+hafnium+yttria+alumina) with a particle size with a d50 value of 250 nm and doped with 0.4% alumina were used, wherein different yttria molar percentages of 1.7%, 1.8%, 1.9%, 2%, 2.1%, 2.25%, 2.5% and 3 mol % have been studied. The remaining control parameters of the starting powder, including surface area, crystallite size. Powder samples with different yttria content were shaped within a dimensional die (20 mm of cavity diameter) by uniaxial pressing at 70 MPa for 30 s. Subsequently, all samples were subject to a sintering cycle with a heating rate of 2.0° C./min until 1350° C., remaining there for 2 hours, then being cooled at a rate of 5° C./min until room temperature, the results shown in Table I being obtained.

TABLE I

Variation on bending strength and fracture toughness with yttria percentage added to zirconia.

| Test No. | % Y$_2$O$_3$ | crystallite (nm) | BET (m$^2$/g) | Grain size (μm) | Density (g/cm$^3$) | Tetra phase % | Bending strength (MPa) | Fracture toughness (MPa · m$^{1/2}$) |
|---|---|---|---|---|---|---|---|---|
| 1 | 3 | 22 | 24 | 0.23 | 6.05 | 99 | 1250 | 5.4 |
| 2 | 2.5 | 23 | 25 | 0.25 | 6.03 | 98 | 1310 | 7.2 |
| 3 | 2.25 | 24 | 25 | 0.22 | 6.03 | 97 | 1254 | 8.9 |
| 4 | 2.10 | 25 | 26 | 0.21 | 6.02 | 96 | 1210 | 11.2 |
| 5 | 2 | 22 | 25 | 0.24 | 6.04 | 95 | 1285 | 15.1 |
| 6 | 1.8 | 25 | 26 | 0.21 | 6.01 | 95 | 1270 | 22.0 |
| 7 | 1.7 | 22 | 27 | 0.22 | 6.01 | 80 | 600 | 20.0 |

As can be seen from Table I in all tests undertaken the sintered ceramic material had densification levels above 98% and a homogeneous grain size between 0.2 and 0.25 μm.

From the analysis of the above figures it can be seen that the reduction in yttria percentage leads to an increase in the fracture toughness values, which would be expected. However, the tetragonal phase percentages surprisingly remained above 95% and the bending strength was also maintained above 1200 MPa, virtually unchanged. Merely below 1.8% (with 1.7 mol %) does the tetragonal phase begins to decrease and bending decreases considerably. It has been found that within the range between 1.8% and 2.1 mol % yttria a binomial of bending strength and fracture toughness values greater than 1200 MPa and 10 MPa·m$^{1/2}$, respectively, can be obtained by uniaxial pressing at 70 MPa.

Tests 8-9 (Shaping Method by Hot Isostatic Pressing (HIP))

Figure 4:
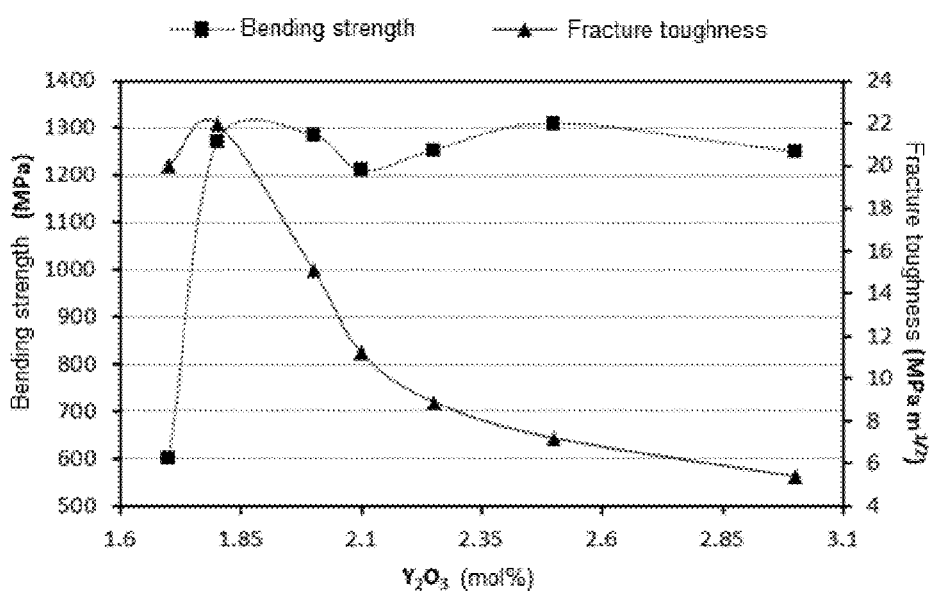
FIG. 4 shows the effect of yttria percentage on bending strength and fracture toughness of the ceramic material obtained by conventional sintering.
Figure 5:
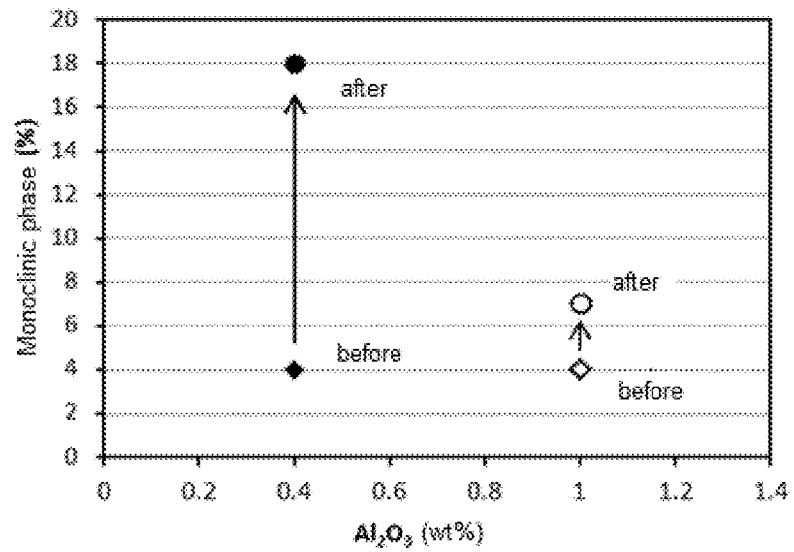
FIG. 5 shows the effect of alumina percentage on monoclinic phase percentage before and after the aging test for samples obtained by HIP.
Figure 6:
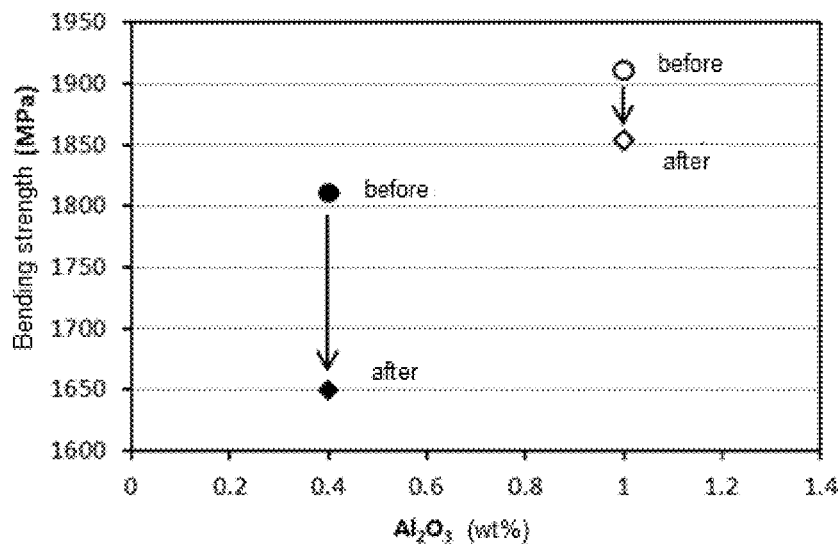
FIG. 6 shows the effect of alumina percentage on bending strength before and after aging for samples obtained by HIP.
Figure 7:
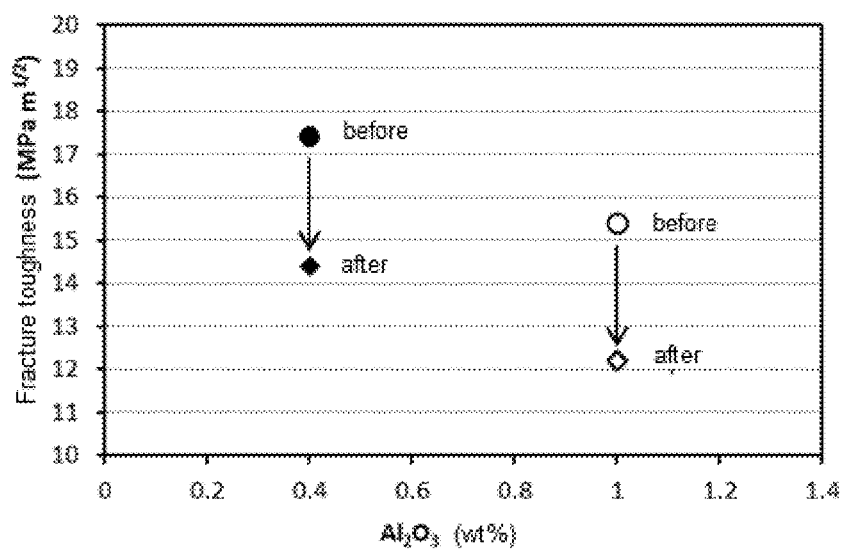
FIG. 7 shows the effect of alumina percentage on fracture toughness before and after aging for samples obtained by HIP.

In tests 8 and 9, zirconia samples identical to those used IN test 6, that is with an yttria content of 1.8 mol %. In a first step (FIG. 4) these samples were subject to uniaxial pressing at 70 MPa, followed by sintering at 1300° C. for 2 hr, with a heating and cooling rate of 2° C./min and 5° C./min respectively, aiming at removing completely the open porosity of the sintered material. Afterwards, hot isostatic pressing at a temperature of 1250° C. for 1 h was applied. The characterization of the samples is shown in Table II.

TABLE II

Influence of the sintering method by HIP on bending strength and fracture toughness of samples prepared with 1.8 mol % yttria.

| Test No. | mol % yttria | crystallite (nm) | BET (m$^2$/g) | Grain size (μm) | Density (g/cm$^3$) | Tetra phase % | Bending strength (MPa) | Fracture toughness (MPa · m$^{1/2}$) |
|---|---|---|---|---|---|---|---|---|
| 8 | 1.8 | 22 | 24 | 0.19 | 6.06 | 95 | 1811 | 17.4 |
| 9 | 1.8 | 23 | 25 | 0.18 | 6.06 | 97 | 2020 | 15.2 |

It is noted that with hot isostatic pressing (HIP) the final grain size is less than 0.15 to 0.20 and the bending strength values obtained are substantially higher, shortly, BY HIP is made possible to achieve a binomial of bending strength and fracture toughness in the range 1800-2100 MPa and 15-20 MPa·m$^{1/2}$, respectively.

Tests 10-11 (Surface Area Effect)

In tests 10 and 11, similar samples were used with a molar yttria content (1.8 mol %), but now with a lower (16 m$^2$/g instead of 25 m$^2$/g) BET (surface area measurement from Brunauer, Emmett, Teller). Zirconia sintered samples were prepared in the same manner as in tests 1-7, that is, were shaped by uniaxial pressing at 70 MPa for 30 s. Thereafter, sample 10 was subject to a sintering cycle at a heating rate of 2.0° C./min at 1350° C., where it remained for 2 hours, then being cooled at a rate of 5° C./min at room temperature. Sample 11, in turn, was sintered at 1450° C., with heating/cooling rates identical to sample 10. The results are shown in Table III.

TABLE III

Variation on bending strength and fracture toughness upon decrease of specific surface area of the starting powder.

| Test No. | Mol % yttria | crystallite (nm) | BET (m$^2$/g) | Grain size (μm) | Density (g/cm$^3$) | Tetragonal Phase % | Bending strength (MPa) | Fracture toughness (MPa · m$^{1/2}$) |
|---|---|---|---|---|---|---|---|---|
| 10 | 1.8 | 22 | 16 | 0.22 | 5.96 | 95 | 950 | 13.4 |
| 11 | 1.8 | 23 | 16 | 0.35 | 6.04 | 88 | 1010 | 15.2 |

It has been found that upon decreasing BET, a temperature of 1350° C. is not enough to obtain a densification degree greater than 98% and hence sample 10 has a low bending strength (950 MPa). In order to achieve the required densification degree, the sintering temperature must be increased to 1450° C. (sample 11), but this temperature increase causes the microstructure grain to grow excessively (0.35 μm) and the tetragonal phase and bending strength to decrease.

Test 12-14 (Aging and the Alumina Content)

In order to assess strength against aging, the sample from test 8 was subject to an aging test according to ISO 13356 Implants for surgery (autoclave at 134° C./5hr at 0.2 MPa), the following results being obtained:

TABLE IV bending strength and fracture toughness of
samples prepared by HIP after aging test

| Test No. | Mol % yttria | crystallite (nm) | BET ($m^2/g$) | Grain size (μm) | Density ($g/cm^3$) | Mono phase % | Bending strength (MPa) | Fracture toughness ($MPa \cdot m^{1/2}$) |
|---|---|---|---|---|---|---|---|---|
| 12 | 1.8 | 22 | 24 | 0.19 | 6.06 | 18% | 1650 | 14.4 |

The appearance of the monoclinic phase (18%) was observed below the threshold provided in the standard (maximum 25%), and a decrease of about 150 MPa on bending strength and 3 $MPa \cdot m^{1/2}$ in fracture toughness is observed, even though both decreases are within the limits provided for in the standard (<20%).

Then a sample was prepared identically to that of test 8 was prepared, but with alumina doping content increased from 0.4 to 1%, thereby yielding the following results before and after the aging test.

TABLE V

Variation on bending strength and fracture
toughness with yttria percentage added to zirconia (1 mol %).

| Test No. | Mol % yttria | crystallite (nm) | BET ($m^2/g$) | Grain size (μm) | Density ($g/cm^3$) | Tetra phase % | Bending strength (MPa) | Fracture toughness ($MPa \cdot m^{1/2}$) |
|---|---|---|---|---|---|---|---|---|
| 13 | 1.8 | 22 | 24 | 0.19 | 6.06 | 96 | 1911 | 15.4 |
| 14 | 1.8 | 23 | 25 | 0.18 | 6.06 | 93 | 1854 | 12.2 |

It has been found that upon increasing the alumina content, a slight decrease in toughness was obtained, however, the aging strength is markedly increased thus forming only 7% of monoclinic phase.

The present embodiment is of course in no way restricted to the embodiments herein described and a person of ordinary skill in the art will be capable of providing many modification possibilities thereto without departing from the general idea of the invention as defined in the claims.

The embodiments described above are obviously combinable with each other. The following claims define further preferred embodiments.

The invention claimed is:

1. Sintered ceramic material obtained from a powder composition, the powder composition consisting essentially of:
   yttria-stabilized zirconia consisting essentially of 1.8 to 2.1% $mol_{yttria}$,
   a crystallite size of less than 40 nm
   a surface area of 17-35 $m^2/g$,
   80% of the powder particles comprises a particle size of 0.2 -0.4 μm,
   doped with alumina between 0.2 and 1.5% $W_{alumina}/W_{material}$, and
   a chemical purity degree of yttria-stabilized zirconia greater than 99.9% considering the sum of Zr+Hf+Y+Al+O,
   wherein the sintered ceramic material has
   a tetragonal phase greater than 90% at room temperature, and
   a grain size between 0.1 μm and 0.25 μm.

2. Sintered ceramic material according to claim 1 wherein toughness ranges from 10 to 25 $MPa \cdot m^{1/2}$ and bending strength ranges from 1150 to 2100 MPa.

3. Sintered ceramic material according to claim 1 wherein the yttria-stabilized zirconia comprises 1.8 to 1.99% $mol_{yttria}$.

4. Sintered ceramic material according to claim 1 wherein the yttria-stabilized zirconia comprises 1.85 to 1.95% $mol_{yttria}$.

5. Sintered ceramic material according to claim 1, wherein the monoclinic phase after aging is less than 18%.

6. Sintered ceramic material according to claim 1, wherein the sintered ceramic material comprises a grain size between 0.10 and 0.20 μm.

7. Sintered ceramic material according to claim 1, wherein the sintered ceramic material density is greater than 5.97 $g/cm^3$.

8. Sintered ceramic material according to claim 1, with a porosity less than 2%.

9. Sintered ceramic material according to claim 1, wherein tetragonal phase is greater than 91%.

10. Sintered ceramic piece comprising the sintered ceramic material according to claim 1.

11. Sintered ceramic piece according to claim 10 wherein the piece is an extrusion die, or prosthesis, or a cutting tool, or a motor component, or a drawing component, or prostheses, or implants, or ornamental applications.

12. Manufacturing process of the sintered ceramic piece according to claim 11 comprising the following steps:
   feeding into a shaping die a powder composition consisting essentially of yttria-stabilized zirconia consisting essentially of 1.8 to 2.1% $mol_{yttria}$, a crystallite size of the powder particle less than 40 nm, doped with alumina between 0.2 and 1.5% $W_{alumina}/W_{material}$, and a chemical purity degree of yttria-stabilized zirconia greater than 99.9% considering the sum of Zr+Hf+Y+Al+O;
   shaping and sintering the powder composition at a temperature between 1100° C. and 1400° C., wherein the sintered ceramic piece has a tetragonal phase greater than 90% and a grain size between 0.1 μm and 0.25 μm; and
   obtaining the sintered ceramic piece.

13. Sintered ceramic material obtained from a powder composition, the powder composition consisting essentially of:
yttria-stabilized zirconia consisting essentially of 1.8 to 2.1% $mol_{yttria}$,
a crystallite size of less than 40 nm,
doped with alumina between 0.2 and 1.5% $W_{alumina}/W_{material}$, and
a chemical purity degree of yttria-stabilized zirconia greater than 99.9% considering the sum of Zr+Hf+Y+Al+O,
wherein the sintered ceramic material has
a tetragonal phase greater than 90% at room temperature, and
a grain size between 0.1 µm and 0.25 µm.

\* \* \* \* \*